United States Patent [19]
Sciaky

[11] 3,980,857
[45] Sept. 14, 1976

[54] CONTROL AND MONITOR FOR ROTATING ARC WELDER

[75] Inventor: David Sciaky, Chicago, Ill.

[73] Assignee: Welding Research, Inc., Chicago, Ill.

[22] Filed: Oct. 29, 1974

[21] Appl. No.: 518,796

[52] U.S. Cl. ................................. 219/100; 219/97; 219/110
[51] Int. Cl.² ......................................... B23K 11/02
[58] Field of Search ............. 219/97, 100, 101, 104, 219/108, 109, 110

[56] References Cited
UNITED STATES PATENTS

| | | | |
|---|---|---|---|
| 3,287,539 | 11/1966 | Stevens | 219/100 |
| 3,484,578 | 12/1969 | Sciaky | 219/97 |
| 3,609,285 | 9/1971 | Scarpelli | 219/109 |
| 3,612,811 | 10/1971 | Lifshits et al. | 219/104 X |
| 3,681,563 | 8/1972 | Lifshits et al. | 219/97 |
| 3,727,822 | 4/1973 | Umbaugh | 219/109 X |
| 3,748,431 | 7/1973 | Melbard et al. | 219/97 |

Primary Examiner—Arthur T. Grimley
Assistant Examiner—Clifford C. Shaw
Attorney, Agent, or Firm—Julius L. Solomon

[57] ABSTRACT

A method and apparatus for monitoring parameters which control the quality of welds made by the rotating arc method. Total electrical energy delivered to the parts being welded is controlled and its analog divided by the time during which this energy was applied to obtain average rate of energy delivered. Total mechanical work done on parts being welded and the mechanical relative displacement of machine platens is measured and work analog is divided electronically by the displacement analog to determine average mechanical work per unit of displacement. The two averages thus obtained are compared to preset levels of average electrical energy and mechanical work which have been established empirically. Indicators warn the operator of any variation from the norm. Separate indications and comparisons are also made of each of the parameters.

8 Claims, 2 Drawing Figures

CONTROL AND MONITOR FOR ROTATING ARC WELDER

This invention relates to welding equipment of the rotating arc type which includes means for causing an arc to move along the edges of workpieces to be welded, as well as apparatus for upsetting the weld. More specifically, it refers to a method and apparatus for monitoring the several important parameters relating to weld quality so as to insure the quality of welds being made with a machine designed to operate automatically at high production rates. The rotating arc welding process may be likened to the flash welding process but has the advantage over the flash welding process, in the welding of tubes, for example, that there is no great loss of material being burnt away as there is during the flashing process, with a consequent savings in material. In addition to this, the power demand is much lower than that required in flash welding. Reference may be made to U.S. Pat. Nos. 3,484,578 and 2,286,211 which refer to the rotating arc method.

Inasmuch as there is very little loss in material during the rotating arc welding process, in contrast to the tremendous loss of material during the flash welding process, one could reason that inasmuch as all electrical energy utilized in heating the ends of the work during the rotating arc welding process is being transferred to the material and remains with the material being welded, one could measure the instantaneous power being utilized, integrate this with respect to time, terminate the arc current when a pre-established level of energy is reached, and simultaneously initiate the upset regime and thus be assured of a good weld. This method for controlling the energy input into the weld would be satisfactory and could give one a reasonable assurance that the weld would be good if the instantaneous power input into the weld remained fixed and if the upsetting action were repeated exactly the same for each weld as for the weld which was used in setting up the standard welding parameters for welding the particular parts in question. It is well known, however, that in actual practice the power supply voltage may change and the arc current, as a result, will change. Because of the resulting instantaneous power variations the duration of the total arc weld time would vary from weld to weld although the total input energy into each of the workpieces being welded were kept the same.

In view of the great variations in line voltage which exist on most power supply systems due to variations in the loading of the generating equipment from hour to hour and from day to day, one can readily recognize that there would be wide variations in instantaneous energy used which would result in wide variations in arc weld period and that welding results may not be satisfactory in those cases where the weld was made during a period of low instantaneous energy input and the consequent unduly long weld time. Because of the greater duration of arcing current there would be a greater loss of heat by conduction and radiation from the ends of the piece parts being welded. The areas to be welded would not be allowed to reach the proper temperature required for welding and the resultant joint after upset would be unsatisfactory.

There is also the possibility that the parts may slip with respect to the clamps during the application of the high upset force required for forging the work. Slipping of the clamps would result in a lower than desired forging force applied between the parts being welded. This low forging force would result in a weld of less than normal strength or possibly no weld at all.

The present invention has as its object the monitoring of the important parameters relating to the production of a good weld and the provision of indicators which would warn the operator of the machine whenever a specific weld was performed with parameters outside pre-established and preset limits.

A more specific object is to provide means for simultaneously measuring the total energy being utilized by the arc welding power supply and the total time required to provide this energy.

Another object is to provide means for measuring the total mechanical work which is done upon the parts being welded during the upsetting period.

Another object is to provide monitoring means which would indicate to the machine operator that the mechanical work done upon the weldment was outside pre-established limits.

Another object is to provide indicating means which would signal the operator of the machine if the total electrical energy and the total mechanical energy were outside pre-established limits.

There are many welding applications which require the maximum in strength and quality of the weld and where failure of the part might result in loss of life or physical damage and thus create great liabilities. For example the application of welding to drive shafts, steering shafts and axles of vehicles would require that the weld be of the highest quality. Another area of critical application would be in weldments used in nuclear reactors. In these critical weldments the welds are checked very often, for example by making an x-ray inspection or by ultra-sonic or magnetic particle inspection. However these methods are not fool-proof and very often give one a false sense of security. For example parts which are in intimate mechanical contact but not welded may be x-rayed and appear to be sound when in reality no weld exists, however one is led to believe that the parts are welded. This can happen, for example, when flash welding if parts are forged before they reach the proper temperature. At too low a temperature the parts may be somewhat plastic at the start of the forging operation however there would be no fusion of the two parts but merely a good mechanical contact with no molecular bond.

The present invention may be utilized to provide a measure of assurance that the weld will be sound knowing that the total electrical energy input within a pre-established period of time and the total mechanical energy input during forging applied over an established distance has been effected within a pre-established tolerance. It is necessary that both the mechanical energy and the relative displacement of the platens be measured inasmuch as there may be slippage of the parts during the upset period due to improper placement of the parts in the dies leaving a gap between the part and the backup bars which would require additional motion and time for the mechanical action to be completed. In order to be assured that the mechanical regime is properly carried out one may measure the force being applied to the piece parts and the distance over which the force is exerted so as to obtain a measure of the work being done mechanically upon the weld. Here again an indication of the total work would be insufficient inasmuch as if this total work was carried out over too great a distance the welding results may not be satisfactory. This invention provides an indication of the measurement of the distance over which the force is exerted which may be displayed or caused to actuate an indicating bell or light in the event that the distance travelled exceeded a pre-established limit. By the combination of control elements whereby the total energy into the weld is measured out and the time monitored and where the total work done upon the weld is measured and the distance monitored, one can set up empirically certain limitations over which one could be assured that the welding results will be satisfactory.

Reference will now be made to a particular embodiment of the invention and to the following figures to describe the method and apparatus comprising the invention.

Figure 1:
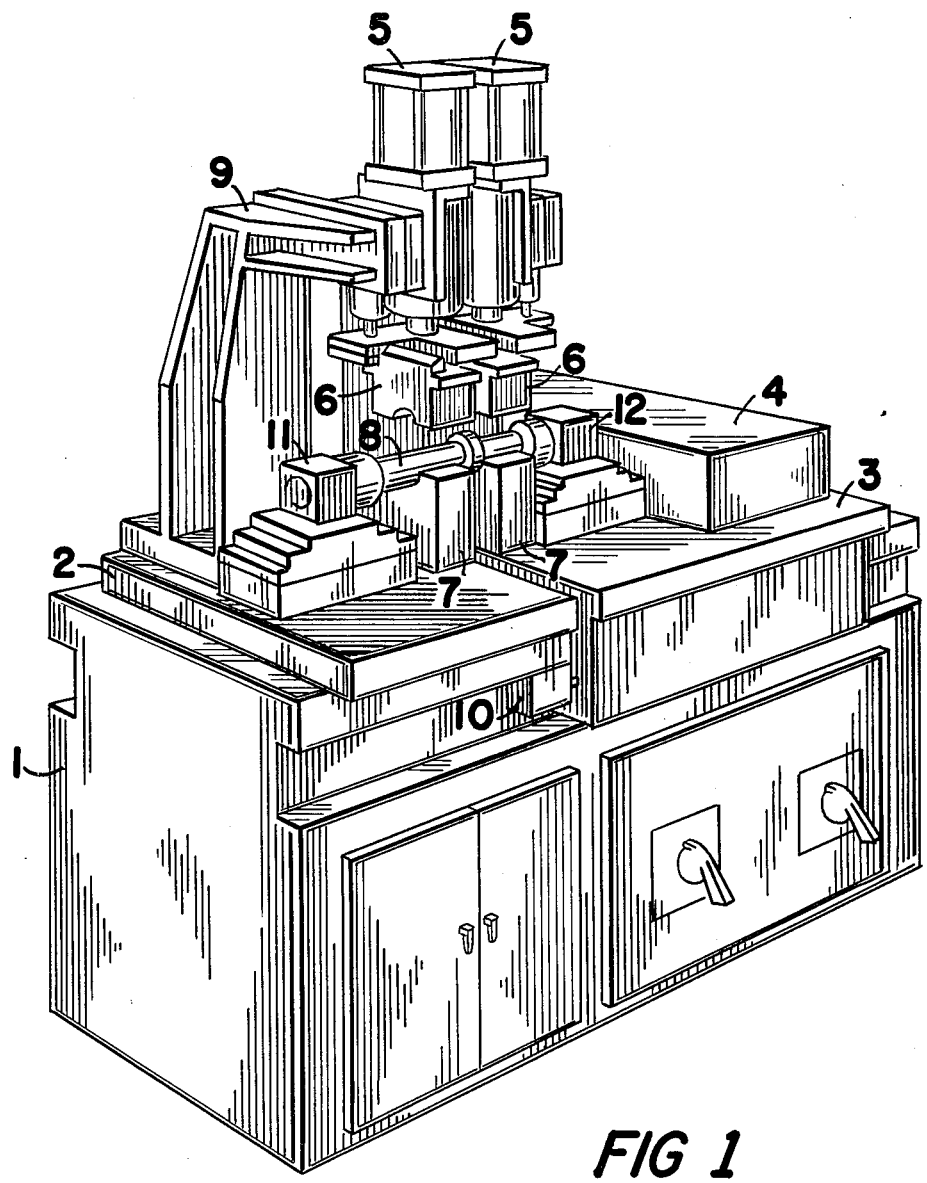
FIG. 1 is a perspective drawing of a typical rotating arc welding machine.

FIG. 1 shows the general arrangement of the rotating arc welding machine in which the frame 1 has mounted upon it a stationary platen 2 and a sliding platen 3. The piece parts 8 are nested in support blocks 7, one support block mounted on the stationary platen and the other on the sliding platen. The upper clamps 6 are urged downward by the action of pneumatic clamping cylinders 5 which cause the two separate parts to be welded to be clamped between the support 7 and the upper clamp 6. The pneumatic cylinders are supported by structures 9, one fixed to the stationary platen and the other to the sliding platen 3. A distance transducer 10 is mounted to the frame of the machine in order to measure the relative displacement between the sliding platen and the stationary platen. A force transducer, which is incorporated in the left hand backup 11, is mounted on the stationary platen and produces an electrical analog signal which represents the forging force during the forging and upsetting portion of the weld cycle. A forge force mechanism 4 acts upon the sliding platen 3 urging the sliding platen towards the left and applying force between the two pipes 8 which have been brought to the welding temperature by the heat developed in the arc which is caused to move along the edges of the parts being welded. A magnetic field is developed in the radial direction between the two piece parts by means of an electromagnet supported on the clamping jaws. The reaction between this radial field and the field around the arc struck between the adjacent edges of the piece parts causes the arc to travel along those edges. The arc power supply and controls are mounted in the space within the framework of the machine. The output terminals of the arc power supply are connected one to the stationary platen and the second to the sliding platen. The two platens are electrically insulated one from the other. In order to perform a weld the two parts, for example two tubes 8, are placed on a support 7 with their ends touching the backup supports 11, which includes a force transducer, for the left-hand pipe, and backup support 12 for the right-hand pipe. The pneumatic clamping cylinders are energized so as to cause the upper clamps to move downward and clamp the parts securely. The arc power supply is energized and the arc started either by causing the ends of the two parts to touch each other momentarily or by high frequency spark. Once the arc starts it rotates and after the ends of the pipe reach the proper temperature the forging force mechanism 4 is energized and the sliding platen 3 caused to move towards the left. This motion will be measured by the distance transducer 10 and associated circuitry and the force of reaction against the backup 11 will be measured by the force transducer mounted as part of 11. After the forging period the clamps are released and the sliding platen moved to the right so that the pipes which are not welded may be removed from the machine.

Figure 2:
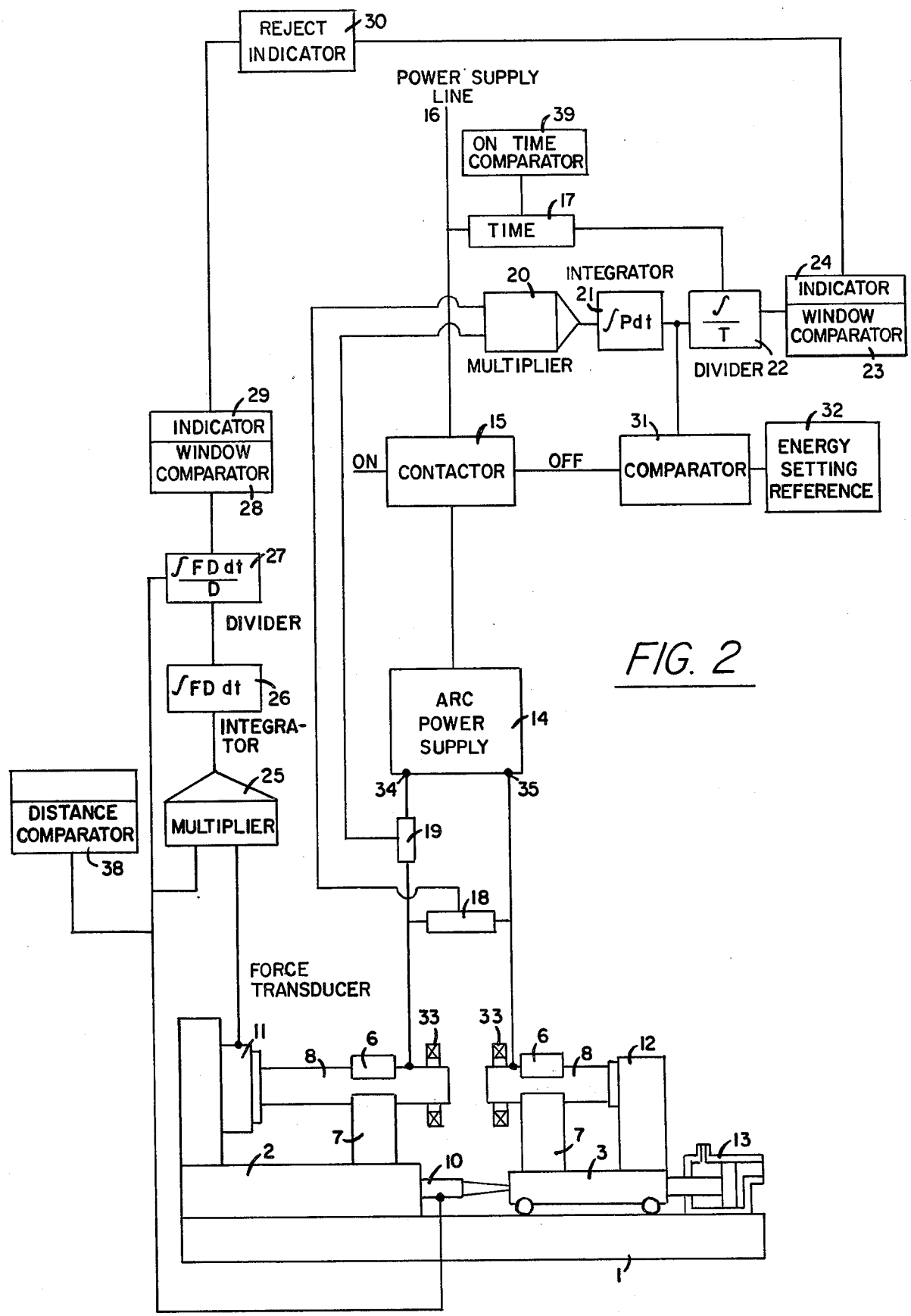
FIG. 2 is a block diagram illustrating the monitoring system in accordance with the invention.

FIG. 2 is a block diagram of the monitoring system and schematic elementary diagram of the important parts of the machine. The arc power supply 14 is fed through contactor 15 from the power supply line 16 after the contactor has been made conductive. The output terminals 34 and 35 of the arc power supply are connected respectively to the pipes 8 to be welded. Solenoid coils 33 supply the radial field for driving the arc along the adjacent edges of the pipes. The voltage and current input to the arc is measured by voltage and current sensing devices 18 and 19 respectively which feed voltage analog signals representing the voltage and the in phase component of the current to multiplier 20. The analog output of 20 which represents instantaneous real power is integrated by integrator 21. The output of the integrator which represents the total energy input into the weld is fed to the comparator 31 which compares the energy signal with a signal from the energy setting reference 32. When the energy signal from 21 equals the reference signal from 32 the comparator will generate a signal which will open the contactor 15. The signal from the integrator 21 is also fed to the divider 22 which receives a second input signal from a timer 17 which measures the time elapsed during which current is being supplied to the arc. The output of the divider represents the average electrical energy per unit time being fed to the work and this signal is fed to a window comparator 23 which will energize lights or signals in indicator 24 depending up whether the average electrical energy per unit time is below, within or above certain preset limits.

If the average electrical energy is within the above pre-established limits an output signal is generated which is delivered to reject indicator 30. At the same time on time comparator 39 receives a signal from timer 17 and compares this to a preset range of time which has been established empirically as being indicative of a proper welding parameter for the weld being made. Indicating signals or lamps will signify whether the weld time was too short or too long.

The above system compares the actual electrical energy delivered to the work and its duration with a pre-established reference energy and time.

A parallel system is utilized to compare the mechanical work done on the piece parts against a pre-established work and upset distance reference. A displacement transducer 10 which generates a signal proportional to the distance between the stationary platen 2 and the moving platen 3 delivers its signal to one of the input terminals of multiplier 25. A force transducer which measures the force developed through the action of forging cylinder 13 generates a signal which is proportional to the force acting between the two pipes 8 during the forging period. The signal developed by the force transducer is fed to the second terminal of the multiplier 25 whose product will represent the instantaneous work being done on the piece parts during the forging. The output of multiplier 25 is fed to integrator 26 whose output represents the total mechanical work done on the parts during the forging process. The output of integrator 26 is fed to divider 27 whose output indicates average mechanical work per unit distance. This output is fed to the window comparator 28 which, in turn, operates indicator lamps or other signals 29 to show whether the work per unit distance is low, above or within pre-established levels. If the work per unit distance is within the pre-set level a signal will be generated which is fed to the alarm or reject indicator 30. The reject indicator will sound an alarm or light an indicator if either one of these signals fed to it are not present signalling that either the energy reference has not been met or the work reference has not been met.

During the upset action the relative motion between the platens may be compared to a preset reference in window comparator 38 which will cause the appropriate indicating lamps or signals of indicator 40 to be actuated to indicate whether the displacement between platens is within, above or below present limits.

The arc power supply may be either single phase or three phase and may have either an alternating current or direct current output. The coils 33 producing the radial magnetic field may be fed from either alternating current at whatever frequency is suitable or direct current, either unidirectional or square wave, depending upon the type of arc power supply utilized. The displacement transducer may be of the sliding linear potentiometer type or the well-known inductor type of linear transducer. The force transducer may be of any convenient type, for example one of the strain gage types may be utilized.

While a certain preferred embodiment of the invention has been specifically disclosed, it is understood that the invention is not limited thereto as many variations will be readily apparent to those skilled in the art and the invention is to be given its broadest possible interpretation within the terms of the following claims.

What I claim is:

1. A method of monitoring the parameters which affect the quality of welds produced in parts being welded by the rotating arc process comprising the steps, after initiation of the arc voltage and current, of;
   generating a voltage which represents the time average of electrical energy delivered to parts being welded;
   generating a voltage which represents the average mechanical work per unit of displacement of the platens supporting the parts, which is performed on the parts during the forging operation as they move with respect to one another;
   causing the said voltages to be compared respectively with ranges of preset voltages which represent respectively values of electrical energy per unit time and values of mechanical work per unit distance which, when delivered to the said parts, result in acceptable welds,
   developing from said comparison an aural or visual signal when either of said voltages are outside the preset range of voltages to which they are compared.

2. A method, as in claim 1, including the steps of measuring the total electrical energy delivered to the parts being welded and interrupting the flow of said energy when said energy reaches a preset level.

3. A method of monitoring the quality of welds produced by the rotating arc process comprising the steps, after initiation of the arc voltage and current, of;
   generating a voltage which represents the voltage fed to the said arc;
   generating a second voltage which represents the electric current passing through the said arc;
   multiplying by electronic means the voltages which represent the arc voltage and current to obtain a voltage which represents the instantaneous electrical power delivered to the work;
   feeding the last mentioned voltage to an electronic integrator so as to obtain a voltage which is the analog of the total electrical energy delivered to the arc;
   generating an analog voltage which is proportional to the length of time the said arc current is flowing;
   causing the said integrated electrical energy analog voltage to be divided by the said time analog voltage in an electronic divider;
   feeding the output of the said divider to a window comparator so as to compare said signal output with a pre-established range of signals;
   generating a signal as a result of said comparison which indicates whether the signal resulting from the said division is below, within the range of, or above pre-established limits for average electrical energy per unit of time;
   generating a voltage which represents the upsetting force between the parts being welded;
   generating a voltage which represents the relative displacement between the platens of the welding machine during the upset period;
   multiplying by electronic means the last mentioned voltages so as to obtain a product voltage which represents the instantaneous mechanical work done on the parts being welded;
   integrating by electrical means the last mentioned product voltage so as to obtain an analog voltage representing the total mechanical work performed on the parts being welded;
   dividing by electrical means the last mentioned analog voltage by the voltage representing the total motion of the platens with respect to each other to obtain a voltage representing average work per unit displacement of the said platens during said motion;
   comparing the voltage resulting from the last said division with a pre-established range of voltages;
   generating a signal as a result of said comparison which indicates whether the said average work is below, within, or above the range of pre-established limits;
   feeding the signals resulting from the aforesaid energy comparison and work comparison to a means which will develop a warning indication if either one of the last mentioned signals are not within their pre-established limits.

4. A method in accordance with claim 3 including the additional step of causing interruption of the flow of welding current when the total electrical energy input to the parts being welded reaches a preset level.

5. Apparatus for monitoring the quality of welds produced by the rotating arc welding process in parts which are upset and forged by the relative motion between a moving and stationary platen which support the parts on the welding machine, comprising;
   means for delivering a pre-determined electrical energy to the parts being welded;
   means for determining the total time for application of the said energy;

means depending upon the aforesaid two means for generating a voltage which represents the average electrical energy delivered to the work over the said time;

means for comparing the said voltage with a preset voltage range;

means cooperating with said comparison means for indicating whether said voltage is below, within or above the said preset voltage range;

additional means for generating a voltage which represents the upsetting force applied to the parts being welded;

means for generating a voltage which represents the relative displacement between the platens of the welding machine during the upset period;

means depending upon said last two mentioned means for generating a voltage that represents the average mechanical work per unit displacement applied to the parts during the said motion;

means for comparing the last mentioned voltage which represents average mechanical work with a preset reference voltage range;

means associated with the last said comparison means for indicating whether the last mentioned voltage is below, within or above the said second preset voltage range; and means for providing a warning signal if either of said voltages representing average energy per unit time and work per unit of displacement of said platens is not within its associated preset voltage range.

6. Apparatus as in claim 5 which includes additional means for indicating whether the relative motion between the machine platens is within preset limits.

7. Apparatus as in claim 6 which includes means for indicating whether the total weld time is within preset limits.

8. Apparatus as in claim 6 which includes means for indicating whether the mechanical work is within preset limits.

* * * * *